United States Patent
Ma et al.

(10) Patent No.: US 7,568,804 B2
(45) Date of Patent: *Aug. 4, 2009

(54) HIGHLY EFFICIENT SINGLE PANEL AND TWO PANEL PROJECTION ENGINES

(75) Inventors: Jiaying Ma, Maplewood, MN (US); Charles L. Bruzzone, Woodbury, MN (US); David J. W. Aastuen, Farmington, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 86 days.

This patent is subject to a terminal disclaimer.

(21) Appl. No.: 11/748,799

(22) Filed: May 15, 2007

(65) Prior Publication Data

US 2007/0211217 A1 Sep. 13, 2007

Related U.S. Application Data

(63) Continuation of application No. 10/439,449, filed on May 16, 2003, now Pat. No. 7,237,899.

(51) Int. Cl.
G03B 21/00 (2006.01)
G03B 21/14 (2006.01)

(52) U.S. Cl. .......................................... 353/20; 353/31
(58) Field of Classification Search .................. 353/20, 353/31, 33, 84
See application file for complete search history.

(56) References Cited

U.S. PATENT DOCUMENTS

| | | | |
|---|---|---|---|
| 5,303,083 A | 4/1994 | Blanchard et al. | |
| 5,513,023 A | 4/1996 | Fritz et al. | |
| 5,808,798 A | 9/1998 | Weber et al. | |
| 5,882,774 A | 3/1999 | Jonza et al. | |
| 5,884,991 A | 3/1999 | Levis et al. | |
| 5,962,114 A | 10/1999 | Jonza et al. | |
| 5,982,541 A | 11/1999 | Li et al. | |
| 6,108,131 A | 8/2000 | Hansen et al. | |
| 6,139,157 A | 10/2000 | Okuyuma | |
| 6,208,463 B1 | 3/2001 | Hansen et al. | |

(Continued)

FOREIGN PATENT DOCUMENTS

EP    0 428 971    5/1991

(Continued)

OTHER PUBLICATIONS

Duelli M. et al.: "Polarization Recovery System Based on Light Pipes" Proceedings of the SPIE, SPIE, Bellingham, VA, US, vol. 4657, Jan. 20, 2002, pp. 9-16, XP009009490 ISSN: 0277-786X.

(Continued)

Primary Examiner—Christopher E Mahoney

(57) ABSTRACT

Single imager projection systems suffer from low light throughput, compared to three imager systems, because only one color band is illuminated at any one time. As a result, there is a need to increase the operating efficiency of the single imager projection system. The invention is directed to the incorporation of a high extinction ratio pre-polarizer, such as a compensated, multi-layer polarizer, in a single or dual imager projection system. This permits illumination with low f-number illumination light, and thus increases the efficiency of the projection system. The pre-polarizer may be incorporated within a polarization recovery unit to further enhance system efficiency.

16 Claims, 7 Drawing Sheets

U.S. PATENT DOCUMENTS

| | | | |
|---|---|---|---|
| 6,234,634 B1 | 5/2001 | Hansen et al. | |
| 6,243,119 B1 | 6/2001 | Orita et al. | |
| 6,309,071 B1 * | 10/2001 | Huang et al. | 353/31 |
| 6,452,742 B1 | 9/2002 | Crue et al. | |
| 6,486,997 B1 | 11/2002 | Bruzzone et al. | |
| 6,515,801 B1 | 2/2003 | Shimizu | |
| 6,609,795 B2 * | 8/2003 | Weber et al. | 353/20 |
| 6,666,556 B2 * | 12/2003 | Hansen et al. | 353/20 |
| 6,773,112 B2 * | 8/2004 | Suzuki et al. | 353/20 |
| 6,786,604 B2 * | 9/2004 | Aastuen et al. | 353/20 |
| 2002/0135540 A1 | 9/2002 | Yoneyama et al. | |
| 2002/0135874 A1 | 9/2002 | Li | |
| 2002/0154420 A1 | 10/2002 | Magarill et al. | |
| 2003/0016334 A1 | 1/2003 | Weber et al. | |

FOREIGN PATENT DOCUMENTS

| | | |
|---|---|---|
| EP | 1 081 964 | 3/2001 |
| WO | WO 00/63738 | 10/2000 |

OTHER PUBLICATIONS

[Online] XP002289044 Apr. 5, 2003 Retrieved for the Internet: URL:http://web.archive.org/web/20030504210709/http://optice.unaxis.com/pod/SysDirs/publish/release/106RE.pdf.

* cited by examiner

HIGHLY EFFICIENT SINGLE PANEL AND TWO PANEL PROJECTION ENGINES

CROSS REFERENCE TO RELATED APPLICATION

This application is a continuation application and claims the benefit of U.S. patent application Ser. No. 10/439,449, filed May 16, 2003, now U.S. Pat. No. 7,237,899, the disclosure of which is incorporated by reference herein in its entirety.

FIELD OF THE INVENTION

The present invention is directed generally to systems for displaying information, and more particularly to projection systems using reflective imaging devices.

BACKGROUND

Optical imaging systems typically include a transmissive or a reflective imager, also referred to as a light valve or light valve array, which imposes an image on a light beam. Transmissive light valves are typically translucent and allow light to pass through. Reflective light valves, on the other hand, reflect only selected portions of the input beam to form an image. Reflective light valves provide important advantages, as controlling circuitry may be placed behind the reflective surface and more advanced integrated circuit technology becomes available when the substrate materials are not limited by their opaqueness. New potentially inexpensive and compact liquid crystal display (LCD) projector configurations may become possible by the use of reflective liquid crystal microdisplays as the imager.

Many reflective LCD imagers rotate the polarization of incident light. In other words, polarized light is either reflected by the imager with its polarization state substantially unmodified for the darkest state, or with a degree of polarization rotation imparted to provide a desired grey scale. A 90° rotation provides the brightest state in these systems. Accordingly, a polarized light beam is generally used as the input beam for reflective LCD imagers. A desirable compact arrangement includes a folded light path between a polarizing beamsplitter (PBS) and the imager, wherein the illuminating beam and the projected image reflected from the imager share the same physical space between the PBS and the imager. The PBS separates the incoming light from the polarization-rotated image light. A single imager may be used for forming a monochromatic image or a color image. Multiple imagers are may also be used for forming a color image, in which case the illuminating light is split into multiple beams of different color. An image is imposed on each of the beams individually, which are then recombined to form a full color image. The three imager system requires that the alignment is able to withstand mechanical and thermal stresses. It is desirable to use as much light generated by the light source as possible. It is also desirable for the projection engine to be inexpensive and to have reduced thermal and mechanical instabilities.

SUMMARY OF THE INVENTION

There remains the need for an optical image projection system that includes wide-angle, fast optical components that provide the display of bright, high-contrast images. Furthermore, there remains the need that such systems be inexpensive to manufacture and be resistant to thermal and mechanical instabilities. The invention is directed to the incorporation of a high extinction ratio, high throughput pre-polarizer, such as a compensated, multi-layer polarizer, in a single or dual imager projection system. This permits illumination with low f-number illumination light, and thus increases the efficiency of the projection system. The pre-polarizer may be incorporated within a polarization recovery unit to further enhance system efficiency.

One particular embodiment of the invention is directed to a single imager, light projection system that has an imaging core that comprises a color selector to transmit illumination light in a desired color band, and a single reflective imager unit. An imaging polarization beamsplitter (PBS) reflects light received from the color selector to the single reflective imager unit. A reflective pre-polarizer is disposed to pre-polarize the illumination light before incidence on the imaging PBS, the reflective pre-polarizer has extinction ratio of more than 50:1 for reflected light when illuminated across the visible spectrum with light having an f-number of no more than f/2.5.

Another embodiment of the invention is directed to an imaging core unit for a projection system, that comprises a first polarizing beamsplitter (PBS) disposed to split an illumination light beam into first and second light beams of first and second respective polarization states. The first polarizing beamsplitter is a compensated, multi-layer dielectric PBS. A first polarization rotator is disposed to rotate polarization of light in the first light beam. A first imaging PBS is disposed to reflect light in the first, polarization-rotated light beam to a first reflective imager unit. A first image light beam, reflected by the first imager unit, is transmitted through the first imaging PBS. A second imaging PBS is disposed to reflect light in the second light beam to a second reflective imager unit. A second image light beam, reflected by the second imager unit, is transmitted through the second imaging PBS. A combining PBS is disposed to combine the first and second image light beams into a combined image beam. A second polarization rotator is disposed between the combining PBS and one of the first and second imaging PBS's so as to rotate polarization of one of the first and second image light beams.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1A:
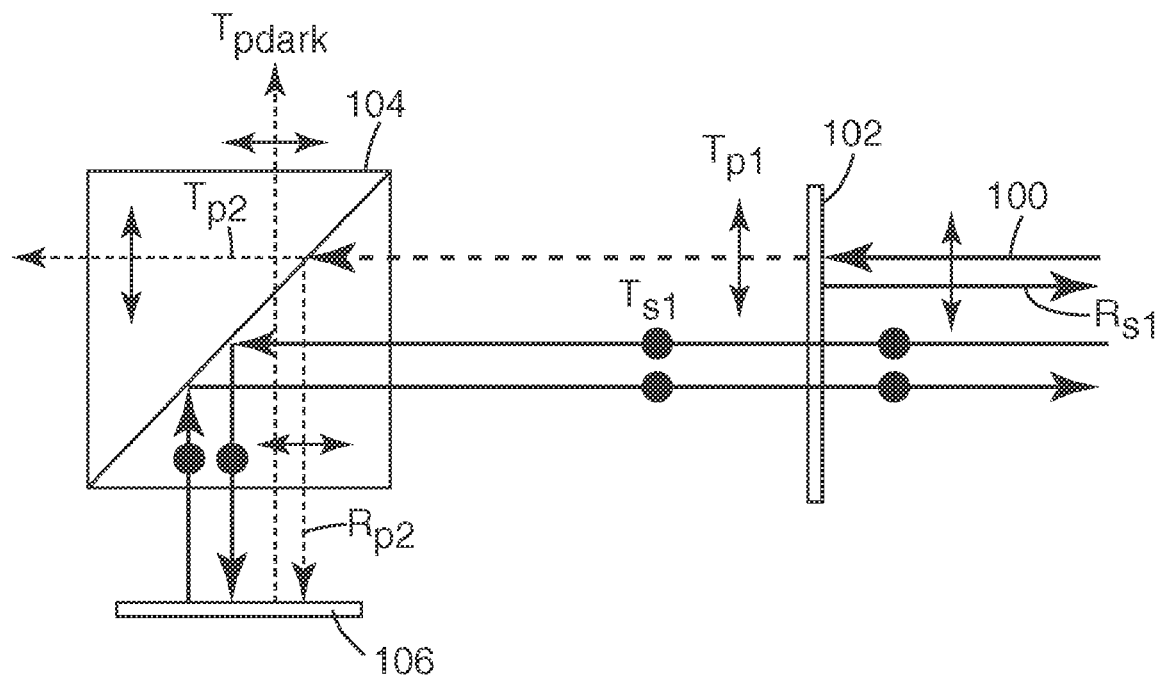
FIG. 1A schematically illustrates a prepolarizer used in conjunction with a reflective imager projector.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to projection systems using reflective imagers and is particularly applicable to low f-number optical imager systems that produce high contrast, high brightness images.

LCD-based displays require that the input light be linearly polarized with an acceptable extinction ratio, defined as the ratio of the power of the light in the desired polarization state over the power of the light in the undesired polarization state. Most light sources, including the ultra high temperature (UHP) lamps, produce light that is not polarized, usually resulting in the use of a pre-polarizer to achieve a desired level of polarization in the incident light. Two types of components have typically been used for pre-polarization: MacNeille polarizing beamsplitters (PBSs) and wire-grid polarizers. Pre-polarization results in discarding 50% of the incident unpolarized light. While achieving an acceptable extinction ratio, these pre-polarizers add additional transmission losses, thus resulting in inefficient use of lamp light.

Several techniques have been used to increase the light efficiency to convert part of the light polarized in the undesired polarization state to the desired polarization state. Such techniques may be referred to as polarization recovery, polarization doubling or polarization recycling. One approach to polarization recovery includes the use of lens arrays to homogenize the light for the lamp. Polarization recovery is allegedly achieved using an array of PBSs and half wave retardation plates. This approach, however, tends to be bulky and expensive. Also, the extinction ratio is very low, typically below 3:1, thus requiring the use of a pre-polarizer between the polarization recovery unit and the imager. Other approaches to polarization recovery are based on the use of a tunnel integrator, but these also suffer from low extinction ratio, necessitating the use of a subsequent pre-polarizer before the light is incident at the imaging PBS. In addition, these approaches to polarization recovery result in reduced étendue in the illumination optics. One approach to improving the performance of imager systems is to use a wide-angle Cartesian polarization beamsplitter (PBS), for example a PBS as discussed in U.S. patent application Ser. No. 09/312,917, filed on 17 May, 1999, and incorporated herein by reference. A Cartesian PBS is a PBS in which the polarization of separate beams is referenced to invariant, generally orthogonal, principal axes of the PBS film. In contrast, with a non-Cartesian PBS, the polarization of the separate beams is substantially dependent on the angle of incidence of the beams on the PBS.

An example of a Cartesian PBS is a multilayer, reflective polarizing beamsplitter (MRPB) film, which is formed from alternating layers of isotropic and birefringent material. If the plane of the film is considered to be the x-y plane, and the thickness of the film is measured in the z-direction, then the z-refractive index is the refractive index in the birefringent material for light having an electric vector parallel to the z-direction. Likewise, the x-refractive index is the refractive index in the birefringent material for light having its electric vector parallel to the x-direction and the y-refractive index is the refractive index in the birefringent material for light having its electric vector parallel to the y-direction. The x-refractive index of the birefringent material is substantially the same as the refractive index of the isotropic material, whereas the y-refractive index of the birefringent material is different from that of the isotropic material. If the layer thicknesses are chosen correctly, the film reflects visible light polarized in the y-direction and transmits light polarized in the x-direction.

One example of an MRPB film is a matched z-index polarizer (MZIP) film, also referred to as a compensated polarizer film, in which the z-refractive index of the birefringent material is substantially the same as either the x-refractive index or the y-refractive index of the birefringent material. The MZIP film has been described in U.S. Pat. Nos. 5,882,774 and 5,962,114, both of which are incorporated by reference. An improved type of MZIP film, having increased lifetime, uses PET/COPET-PCTG as the alternating layers, as is described in U.S. patent application Ser. No. 09/878,575.

Many of the embodiments illustrated herein are described as using reflective Liquid Crystal on Silicon (LCoS) imagers. This is not intended to be a limitation in any way, and it will be appreciated, however, that other types of reflective imager units may be used.

LCoS imagers have the promise of providing low cost, high performance technical solutions for high definition television (HDTV). Single imager designs provide for simpler systems than multiple imager designs, since there are fewer components. In addition, since there is no need for optical elements used for combining the images from multiple imagers, it is possible to provide a shorter back focal length than for multiple imager systems. Furthermore, there is no requirement for imager alignment during engine assembly. One of the drawbacks of single imager projection systems, however, is lower light throughput. This arises due to the fact that, at any one time, the imager is imposing an image for one of three color bands, red, green or blue. Accordingly, light in the other two color bands is not used, and is typically rejected using a color filter such as a color wheel.

Single imager systems become more attractive practical solutions where the light through the projection system can be increased. Different approaches discussed herein to increase the throughput of single panel systems include i) the use of a wide angle pre-polarizer, ii) the use of low f-number illumination optics and iii) the use of low f-number polarization recovery. These three different approaches are discussed in turn, and then a number of different systems that implement these approaches are discussed.

Pre-Polarizer

Two parameters are typically to describe the performance of a pre-polarizer, namely the extinction ratio and the transmission. A portion of a projection engine based on a reflective imager unit, such as an LCoS imager, is schematically illustrated in FIG. 1A. Light 100 is incident on the pre-polarizer 102 from a light source (not shown). The transmission of light through the pre-polarizer 102, having its polarization vector parallel to the plane of the figure, the p-polarization state, is $T_{p1}$ and the transmission of light having its polarization vector perpendicular to the plane of the figure, the s-polarization state, is $T_{s1}$. Note that the s-polarization and p-polarization are references to the plane of the figure, in other words the plane of reflection defined by the polarizing beamsplitter (PBS) 104. The projection system includes a PBS 104 and an imager unit 106. In the illustrated embodiment, The pre-polarizer 102 mostly reflects light in the p-polarization state and mostly transmits light in the s-polarization state. However, a fraction, $R_{s1}$, of the s-polarized light is reflected and a fraction, $T_{p1}$, of the p-polarization light is transmitted. The extinction ratio, E, of the pre-polarizer in transmission is given by $E=T_{s1}/T_{p1}$. Where $T_{s1}$ is close to 1, then $E\approx 1/T_{p1}$.

The PBS 104 transmits a fraction, $T_{p2}$, of the incident p-polarized light, and reflects the remainder, $R_{p2}$. Likewise, the PBS 104 transmits a fraction, $T_{s2}$, of the incident s-polarized light and reflects the remainder, $R_{s2}$.

The contrast of the projection system is determined mostly by light leaking in the dark state. Supposing that in the dark state, the imager 106 does not modify the incoming polarization, then the light leaking is primarily p-polarized light, $T_{pdark}$, which can be calculated from the following expression:

$$T_{pdark}=T_{p1}*R_{p2}*T_{p2}=T_{p1}*(1-T_{p2})*T_{p2} \quad (1)$$

This expression assumes that the polarizers do not absorb light, and only transmit or reject the light. Assuming that the imaging PBS 104 has a high extinction ratio, the contrast of the projection system can be estimated to be $1/T_{pdark}$.

Therefore, the contrast, C, of the projection engine system may be calculated to be:

$$C=E/((1-T_{p2})*T_{p2}) \quad (2)$$

Equation (2) shows that the engine contrast is dependent on the extinction ratio of the pre-polarizer and the p-polarized transmission of the imaging PBS 104.

For an imaging PBS that uses a typical MacNeille-type polarizer, or a wire grid polarizer, $T_{p2}$ is typically 85% at an f-number of 2.5. The contrast is then, according to equation (2), given by 7.85 E. If the overall contrast is to be 1500, then the value of E should be around 192, which is relatively high. The wire grid polarizer trades off extinction with transmission, and so typically has a transmission of less than 85% in order to reach an extinction of 192.

A traditional MacNeille PBS may be used as a prepolarizer in reflection mode. However, due to its high p-polarization reflection, the extinction ratio is low: about 10:1, which is too low for an acceptable engine contrast. A wire-grid polarizer may be used in conjunction with the MacNeille PBS to achieve the required extinction ratio, but this incurs additional light loss and expense.

A compensated, multilayer dielectric PBS, on the other hand, provides high contrast over the entire visible wavelength region and high (>98%) transmission of the p-polarization. With such a high $T_{p2}$, the engine contrast is, according to equation (2), 51E, resulting in an extinction requirement for a pre-polarizer of 30:1. This is significantly less than the pre-polarizer requirements when a wire grid or MacNeille polarizer is used as an imaging PBS. In addition, a compensated, multilayer dielectric PBS may be used as a pre-polarizer. This provides the desired extinction ratio, and also provides a light throughput about 15% higher than the wire grid polarizer.

A compensated, multilayer dielectric PBS may be used as a pre-polarizer in two different ways, namely in transmission or reflection. In transmission, unpolarized light is split by the PBS into reflected light and transmitted light. An imaging PBS is arranged so as to reflect the light transmitted through the pre-polarizer to the imager. The light reflected by the pre-polarizing PBS may be captured in a light trap. In the reflection mode, the light reflected by the pre-polarizing PBS is passed to the imaging PBS. The imaging PBS may be arranged in a way so that it reflects the light from the pre-polarizing PBS to the imager.

Figure 2:
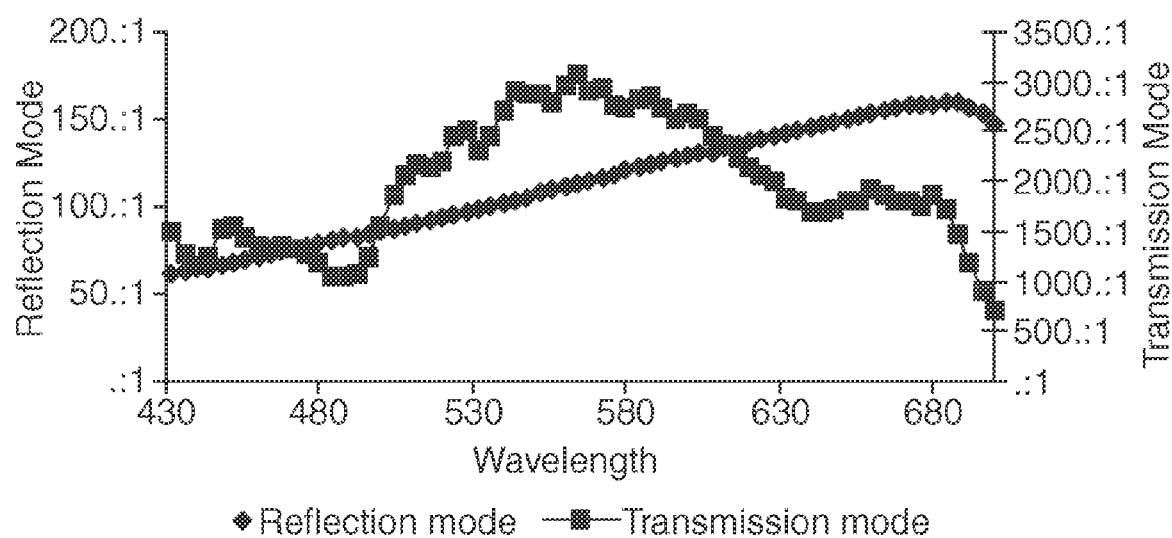
FIG. 2 presents a graph showing the extinction ratio for an MZIP-type polarizing beamsplitter for both transmission and reflection.

The extinction ratio for a compensated, multi-layer dielectric PBS was measured for both transmission and reflection: the results of the measurements are presented in FIG. 2 as a function of wavelength across the visible spectrum. The PBS was a dual multi-layer structure, sandwiched between two SK5 glass prisms, and was illuminated by f/2.0 telecentric illumination optics. The PBS is described further in "Projection System having Increased Contrast", filed on even day herewith, with 3M Ref. No. 58628US002. The extinction ratio is the ratio of the power in the two orthogonal polarization states output from the PBS. In transmission mode, the extinction ratio, $T_p/T_s$, is over 1000:1 over the visible spectrum. In reflection mode, the extinction ratio, $R_s/R_p$, varies between about 60:1 to 150:1. Thus, the reflected extinction ratio is higher than 50:1.

Figure 1B:
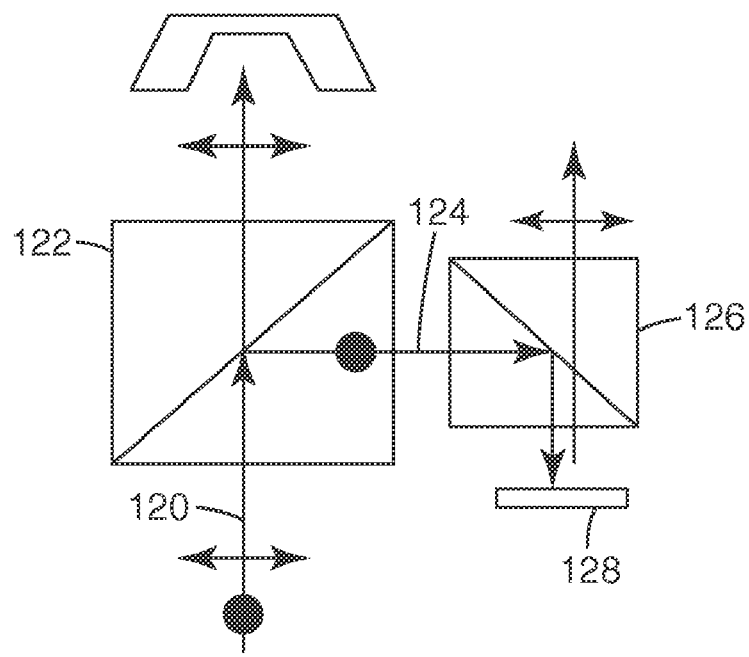
FIGS. 1B and 1C schematically illustrate different configurations of pre-polarizer and imager polarizer for a single imager projection system, according to principles of the present invention.
Figure 1C:
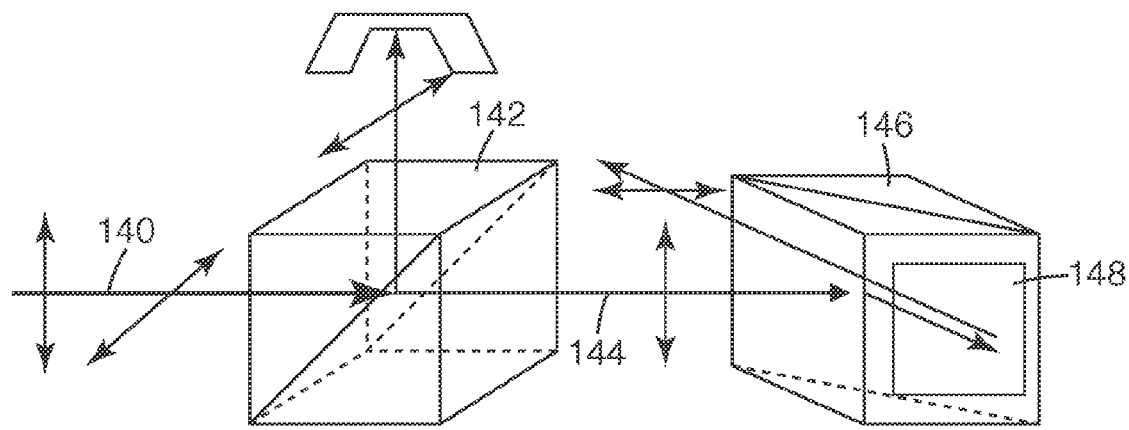

The compensated, multi-layer dielectric PBS may be used as a pre-polarizer in both reflection and transmission. These two different configurations are illustrated in FIGS. 1B-1C. In FIG. 1B, light 120 enters a compensated, multi-layer dielectric pre-polarizer 122. The compensated, multi-layer dielectric pre-polarizer 122 reflects almost 100% of the s-polarized light and less than 2% of the p-polarized light. The predominantly s-polarized reflected light 124 from the pre-polarizer is reflected by an imaging PBS 126 to the imager 128, for example an LCoS imager. Image light 130 reflected from the imager is transmitted through the imaging PBS 126 to a projection lens system (not shown). In this embodiment, the reflected light path lies in the same plane, the plane of the figure. Illumination of the imager 128 is high, because the compensated, multi-layer dielectric pre-polarizer 122 reflects almost 100% of the desired s-polarized light. The imaging PBS 126 may be any suitable type of PBS for wide angle, high contrast operation, such as a compensated, multi-layer dielectric polarizer or a wire grid polarizer.

Another configuration is schematically illustrated in FIG. 1C. In this case, light 140 enters the compensated, multi-layer dielectric pre-polarizer 142. The pre-polarizer 142 is oriented at 90° relative to the orientation of the pre-polarizer 122 illustrated in FIG. 1B, so that s-polarized light is reflected by the pre-polarizer out of the plane of the figure. Light 144 transmitted through the pre-polarizer 142 passes to the imaging PBS 146. The imaging PBS 146 is oriented so that it reflects s-polarization light in the plane of the figure. Therefore, the light 144 transmitted from the pre-polarizer 142 is in p-polarization for the pre-polarizer 142 but is in s-polarization for the imaging PBS 146. The light 144 is reflected by the imaging PBS to the imager 148. Image light 150 is reflected from the imager 148 to a projection lens system (not shown). This system has high contrast, because the pre-polarizer 142 transmits high contrast p-polarization light to the imaging PBS 146.

Low F-Number Optical System

In a projection engine that uses a single imager, the back focal length of the projection lens may be significantly shorter than in a multiple imager system. In a multiple imager system, there is a beam combining element, between the multiple imagers and the projection lens system, to combine the images from the different imagers into a single image beam that is projected for viewing. In the single imager system, there is no requirement for the beam combining element, and so the projection lens can be moved closer to the imager. Typically, the back focal length (BFL) of the projection lens system may be about one half that for a multiple imager system. This allows the f-number of the projection lens system to be smaller than in multiple imager systems, for example as low as f/1.5.

Figure 3:
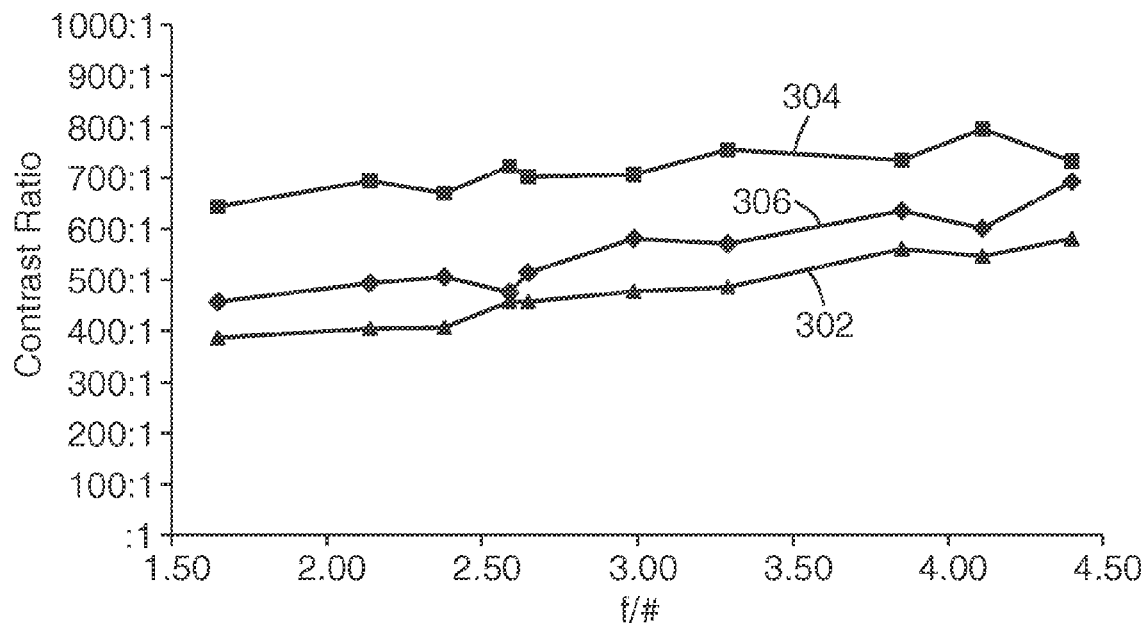
FIG. 3 presents a graph showing contrast ratios for different color bands over a range of different f-numbers.

The contrast of the projection engine, formed from an imager, an imaging PBS and a pre-polarizer, where both the imaging PBS and the pre-polarizer were compensated, multi-layer dielectric polarizers, is not strongly affected by f-number. The contrast ratio was measured for TFS imagers for red, green and blue color bands, over a range of f-numbers, from 1.65 to 4.5 for the illumination light. The contrast ratios, presented in the graph in FIG. 3, were measured in the projected light, projected through an f/2.3 lens. In this particular experiment, the color bands were as follows: blue: 430 nm-500 nm (curve 302); green: 500 nm-600 nm (curve 304); and red: 600 nm-680 nm (curve 306).

The contrast ratio for the blue color band varied from about 400:1 to about 550:1, while the contrast for the green color band varied between about 650:1 and 800:1. The contrast ratio for the red color band fell somewhere in between that for blue and green, varying between about 450:1 and 750:1. In important result from this figure is that the contrast in all color bands was greater than 250:1, and greater than 350:1, for an illumination f-number as low as 1.65. At an illumination f-number of 2.5, the contrast ratio in all color bands was greater than 400:1.

Figure 4:
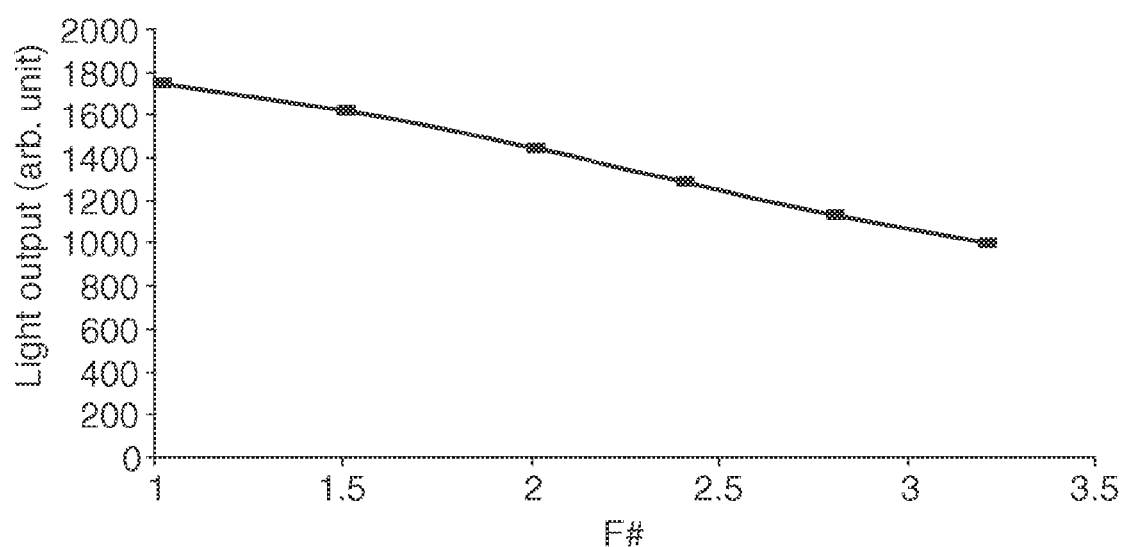
FIG. 4 presents a graph showing light output from a reflective imager projection engine as a function of f-number in the illuminating light.

The amount of light passing through the projection system is dependent on f-number, as is illustrated in FIG. 4, which shows the light throughput from the projection engine, in arbitrary units, as a function of illumination f-number. At f/1.5, the light throughput is about 1600 units, falling to about 1000 units at f/3.2. The variation in light throughput over the range f/1.5-f/4.5 is even greater. As is shown in FIG. 4, a reduction in f-number from f/2.4 to f/1.5 results in an increase in light throughput of about 25%.

Polarization Recovery

Light sources used in projection systems generally produce unpolarized light. Therefore, approximately one half of the light is transmitted and approximately one half of the light is reflected when it is incident on a reflective polarizer. A reflective polarizer is one that separates light into beams of orthogonal polarization by reflecting one of the beams into a direction different form the other. The use of a pre-polarizer, or imaging PBS, with unpolarized light results in about one half of the incident light being discarded. Polarization recovery is a technique that is used to convert the polarization of the incident radiation into the desired polarization, so that a smaller fraction of the light is discarded.

Figure 5A:
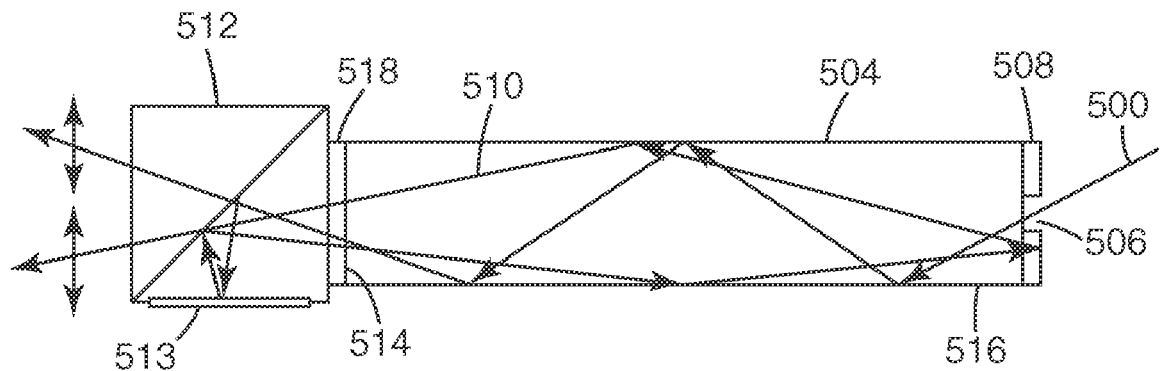
FIG. 5A schematically illustrates an approach to implementing polarization recovery according to principles of the present invention.

One method of doing this is now described with reference to FIG. 5A. Light 500 from the light source (not shown) is directed into a reflective tunnel 504 through an aperture 506 at one end 508. The light 510 bounces down the tunnel to a reflective polarizer 512 at the other end 514. Approximately one half of the light is transmitted through the polarizer 512, while the other half is reflected back into the tunnel 504.

Where the reflective polarizer 512 is a compensated, multi-layer dielectric PBS, a reflector 513 may be used to reflect the reflected light back to the tunnel 504. The use of a compensated, multi-layer dielectric polarizer 512 provides for increased transmission from the tunnel 504 and high extinction ratio.

The light reflected back to the tunnel 504 is recycled through the tunnel 504, reflecting off the reflector 516 input end 508, and eventually emerging from the second end 514 to be incident on the polarizer 512 once more. The multiple reflections within the tunnel depolarize the light to a certain extent, and so some of the re-incident light is transmitted through the polarizer 512. Depolarization from the reflected polarization state may be enhanced using a polarization sensitive layer, such as a quarter-wave retardation plate 518, between the tunnel end 514 and the polarizer 512. Heating effects in the tunnel may be reduced where the tunnel 504 is placed after a color selector.

Figure 5B:
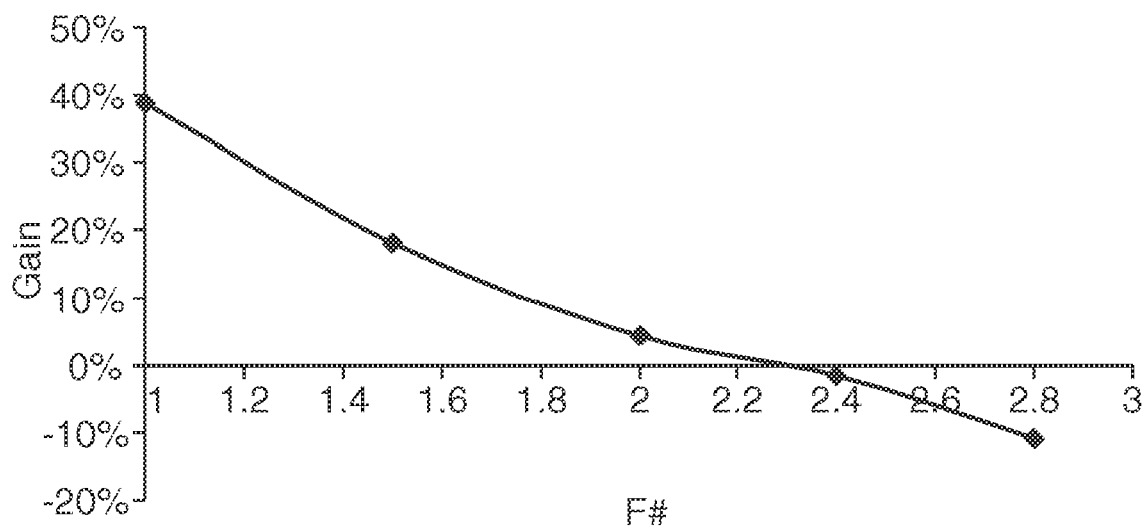
FIG. 5B presents a graph showing the gain in light throughput for a projection system using polarization recovery, as a function of f-number.

Polarization recovery usually incurs a trade off between throughput and étendue. The reduction in étendue typically becomes significant for small imagers at large f-number, which usually limits the application of polarization recovery to large imagers, for example having a diagonal dimension of more than 17.8 mm (0.7") and lamps having a small arc gap. The calculated increase in light throughput using a polarization recovery tunnel for different f-numbers and using an imager having a diagonal dimension of 15.3 mm (0.601") is shown in FIG. 5B. As can be seen, at an f-number of f/2.4 and higher, there is actually a loss of light throughput, rather than an increase. Significant light gain can be obtained, however, with lower f-numbers. For example, at f/1.5, there is a light gain of 18%. This gain can be further increased by using a larger imager. For example, where the imager has a diagonal dimension of 17.8 mm (0.7"), there is a throughput gain of 35% at f/1.5 using a polarization recovery tunnel.

Figure 6:
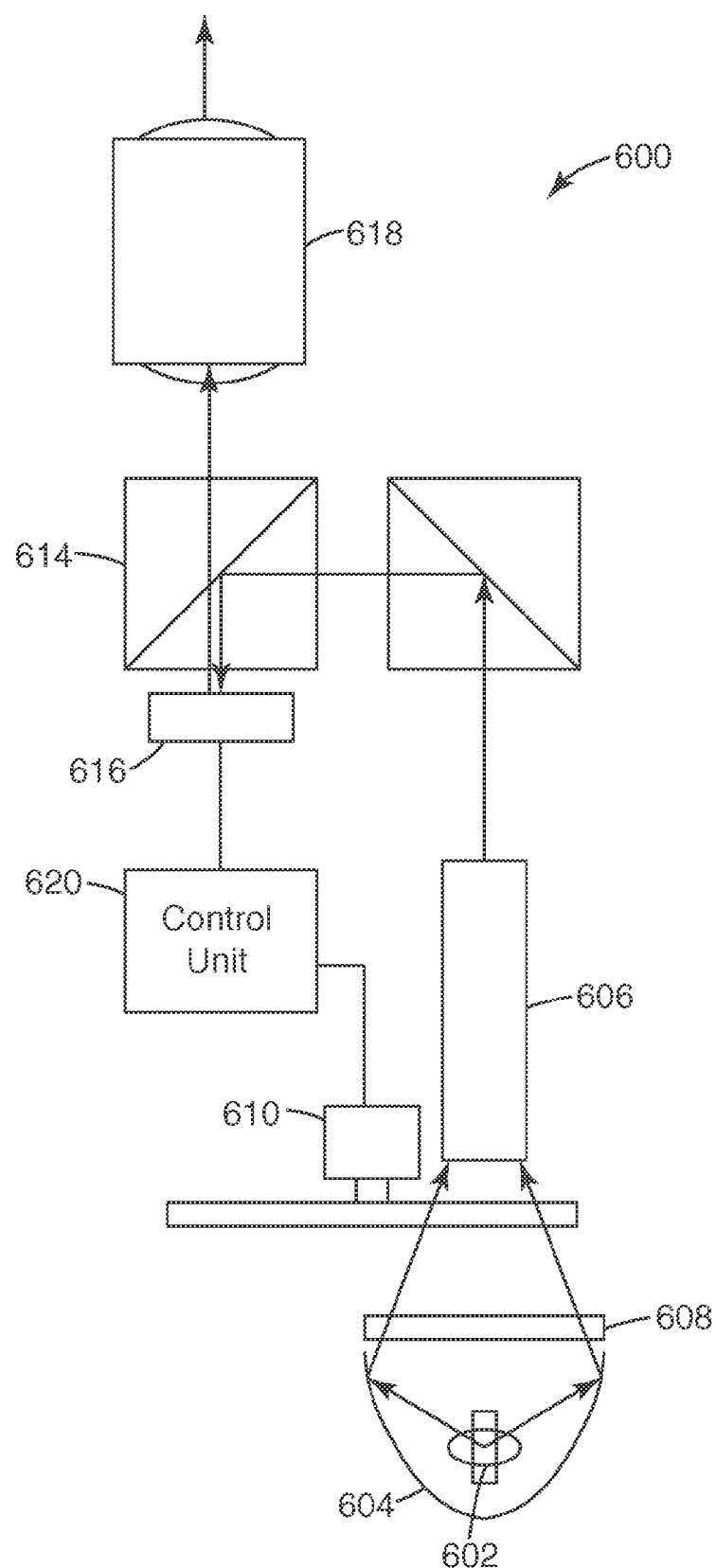
FIG. 6 schematically illustrates an embodiment of a single imager projection system according to principles of the present invention.

The above three approaches, pre polarization, lower f-number and polarization recovery, may all be used to increase the utility of a single imager-based projection system. One example of such a system is now described with reference to FIG. 6. The projection system 600 has a light source 602, for example an arc lamp, to generate light. A reflector 604 may be used to direct light from the light source 602 to a tunnel integrator 606. A filter 608 may be placed before the tunnel integrator 606 to filter out ultraviolet and/or infrared light. A color selector 610, for example a color wheel, may be placed before or after the tunnel integrator 606 to select one color band for illumination at any one time. The tunnel integrator 606 may also include polarization recovery.

A compensated, multi-layer dielectric pre-polarizer 612 may be used to pre-polarize the light before incidence on the imaging PBS 614. The light incident on the imager 614 may have an f-number of 2.5 or less, and may have an f-number of 2.0 or less or even 1.5 or less. The light is reflected by the imaging PBS 614 to the imager 616, which modulates portions of the light beam to impose a polarization modulated image. The image light is passed through the imaging PBS 614 to the projection lens system 618. The light reaching the projection lens system 618 may have an f-number as low as 1.5 or less. The image light has a contrast of more than 250:1 across the visible region (400 nm-700 nm), covered by the color bands imposed on the light by the color selector 610. The image contrast may be more than 350:1 across the color bands.

A control unit 620 may be used to control the image imposed by the imager 616 and to synchronize the image with the color selector 610. Where the projection system 600 comprises the projection engine for a television, for example a high definition television, the control unit 620 may also include a television tuner and other circuitry for processing and projecting a television picture image.

Figure 7:
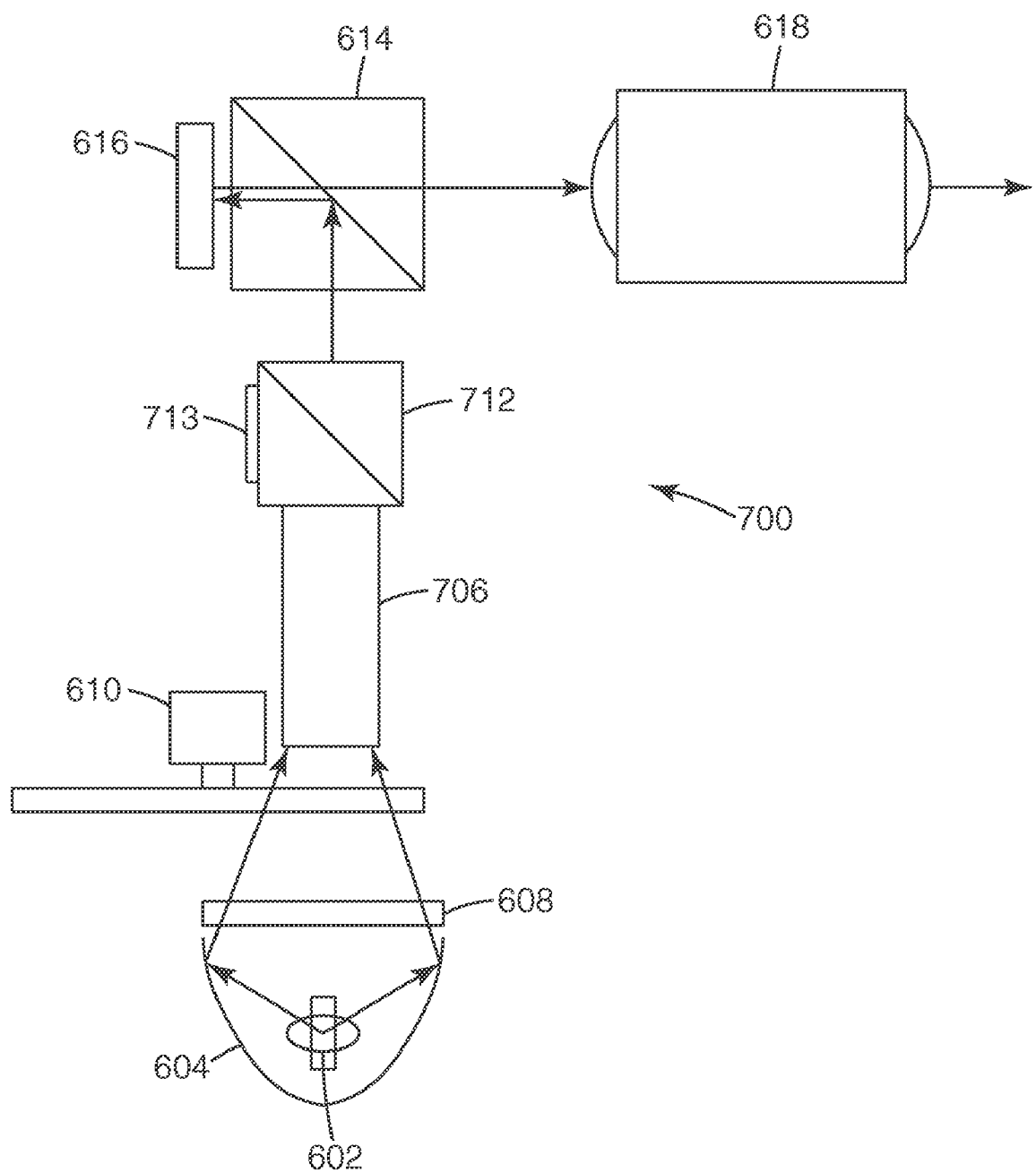
FIG. 7 schematically illustrates another embodiment of a single imager projection system according to principles of the present invention.

It will be appreciated that the compensated, multi-layer dielectric pre-polarizer may be used in transmission, instead of reflection, for example as is illustrated for the projection system 700 in FIG. 7. In this embodiment, the pre-polarizer 712 also forms part of a polarization recovery unit 706 used to convert the polarization of the light from the light source 602 to the desired polarization state. The pre-polarizer 712 may be provided with a reflector 713 to aid in polarization recovery. No other polarizing devices, beyond the pre-polarizer 712 and the imaging PBS 614 are needed to maintain a high contrast, above at least 250:1 over all the color bands, where the image light has an f-number of 2.5 or less.

The single imager projection systems 600 and 700 are very straightforward in design and require a small number of components relative to a conventional three-imager system: the three-imager system uses one imager for each of the three color bands, red green and blue. The single imager projection system is less expensive than the three-imager system, since the number of components is reduced. Furthermore, the cost of the low f-number projection lens system may be further reduced since the back focal length is reduced. The single imager projection system is also simpler to manufacture, since the steps of aligning the images from three different imagers are avoided.

Furthermore, problems from misalignment of the imagers following manufacturing, for example due to thermal and/or mechanical stability are avoided. In a three imager system, the imagers are often mounted directly to their respective PBS's in order to reduce problems arising from mechanical stability. This, however, introduces the problem of requiring good thermal matching between the imager and the PBS. The problems of thermal and mechanical misalignment are reduced in the single imager projection system, and so the imager need not be attached to its PBS. This permits a greater choice in the selection of the glass material used in the PBS.

The projection systems 600 and 700 have high light output for a single imager system, while providing high image contrast. The single imager system achieves image contrast of greater than 350:1 across the red, green and blue color bands at an f-number as low as f/1.5.

Figure 8:
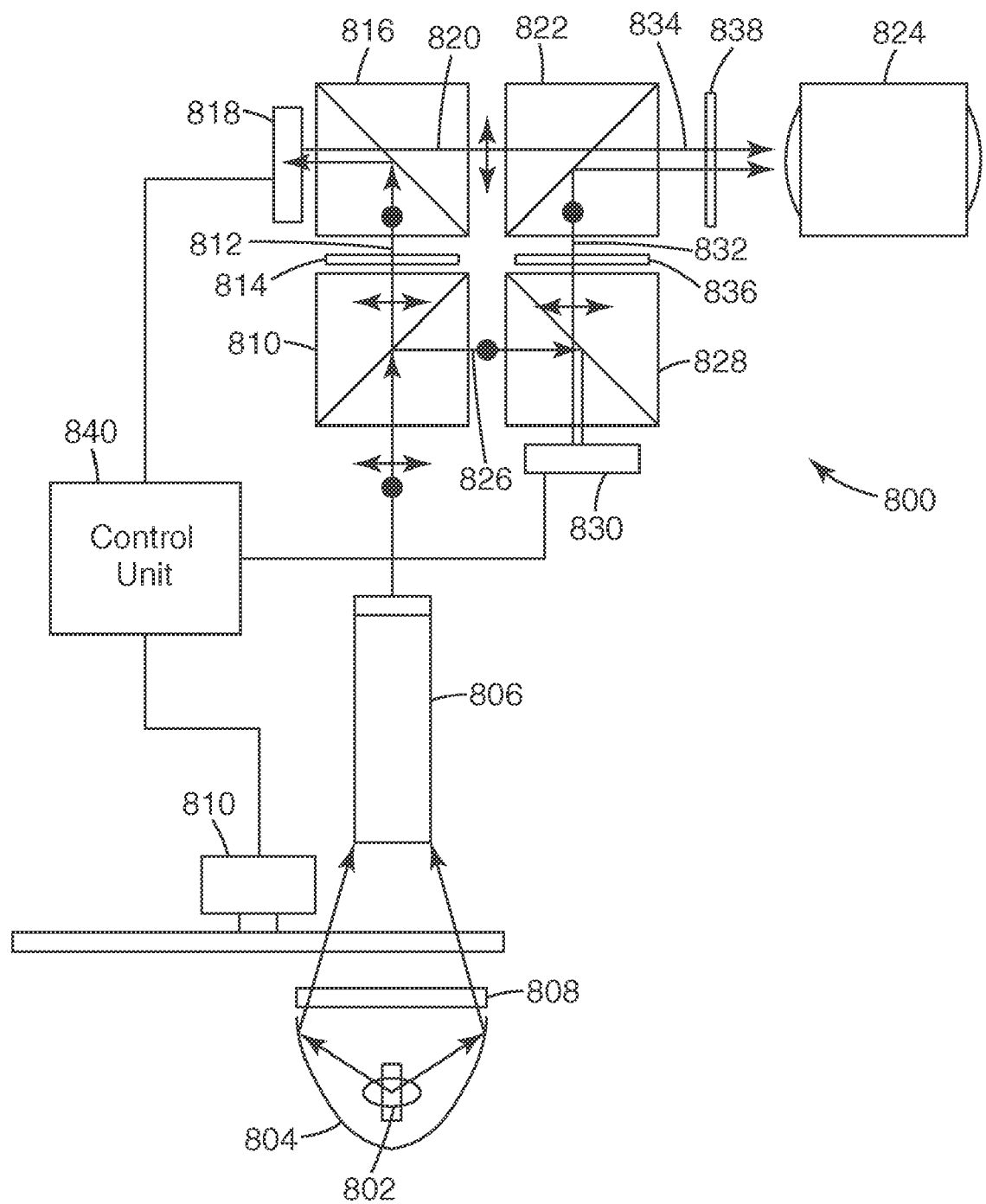
FIG. 8 schematically illustrates an embodiment of a two imager projection system according to principles of the present invention.

One particular embodiment of a two imager projection system 800 that embodies some of the advantages of the single imager system discussed above is schematically illustrated in FIG. 8. This two imager system may produce image light having low f-number, 2.5. or less, and also achieves contrast ratios of more than 350:1 in the different color bands. It does not use a polarization converter. Instead, it uses a single, compensated, multi-layer dielectric pre-polarizer to split the illumination light into two portions that are each superimposed with an image, and the image is then combined into a single output image.

In the illustrated embodiment, the system 800 has a light source 802 to generate light. A reflector 804 may be used to direct the light. A tunnel integrator 806 may be used to make the brightness of the light more uniform. The light passes through a color selector 808, such as a color wheel. A filter, not shown, may be used to filter out unwanted ultraviolet and infrared light.

The system 800 uses compensated, multi-layer dielectric pre-polarizer 810 to split the light into two beams of orthogonal polarization 812 and 824. This pre-polarizer 810 produces orthogonally polarized light beams of high extinction and high throughput. The polarization state of the light at various points within the system 800 is illustrated with a double headed arrow, indicating polarization parallel to the plane of the figure, and with a dark circle, indicating polarization perpendicular to the plane of the paper. The transmitted beam 812 passes through a broadband polarization rotator 814, such as a half wave retarder, and is incident on the first imaging PBS 816, along a first imaging path. The light is reflected to the first imager 818 and the image light 820 is reflected through the combining PBS 822 to the projection lens system 824.

The light 826 reflected by the prepolarizer 810 is directed to a second imaging PBS 828, along a second imaging path. It is important to note that the extinction ratio of the pre-polarizer 810 is sufficiently high that no additional polarizer, for example a clean up polarizer, is needed between the pre-polarizer 810 and the second imaging PBS 828. The second imaging PBS 828 directs the light to the second imager 830. Image light 832 is reflected through the second imaging PBS 828 to the combining PBS 822, where the image light from the first and second imagers 818 and 830 is combined into a single image beam 834 that propagates to the projection lens system 824. The contrast requirements for the combining PBS 824 are lower than for the other PBS's and so, in addition to a compensated, multi-layer dielectric polarizer, the combining PBS 822 may also be a wire grid polarizer, a MacNeille polarizer, or the like. The combining PBS 822 is used to reflect an image, and so the combining surface is preferably flat so as not to distort the reflected image 832 light from the second imager 830.

In the illustrated embodiment a second polarization rotator 836, for example a half wave retardation plate, is positioned between the second imaging PBS 828 and the combining PBS 822, so that the image light transmitted through the second imaging PBS 828 is reflected by the combining PBS 822. It will be appreciated that the second polarization rotator 836 may also be positioned between the first imaging PBS 816 and the combining PBS 822. In such a case, the combining PBS is oriented so as to reflect image light received from the first imager 818 and to transmit image light received from the second imager 830.

The first and second polarization rotators 814 and 836 may be half wave retardation films, and typically have one wavelength where the rotation is exactly half wave, with the rotation being slightly more or less than a half wave for other wavelengths. The optimum wavelengths of the two polarization retarders may be different so that the combined output image beam 834 has a balanced color. For example, ultra high pressure lamps (UHP) are widely used for projection light engines. UHP lamps output strong green light, with the blue and red light output being relatively low. It may, therefore, be desirable for the system to have higher overall throughput for light in the red and blue color bands. A typical broad band half wave retardation film for visible light peaks at green light. In the current embodiment, however, the two polarization retarders may be peaked at different wavelengths, for example, one peaked in the blue color band and the other peaked in the red color band. Accordingly, the red and blue throughput is higher than that of the green light, and the color in the image light is better balanced than if the polarization rotators had been optimized for green light. It will be appreciated that the values of the optimal wavelengths for the polarization rotators may be selected to meet specific color requirements. The selection may be based on a number of factors including, but not limited to, the color balance of the light emitted from the light source and the absorption of light within the different optical components of the system.

If a single output polarization state is desired, a quarterwave polarization retarder 838 may be disposed between the combining PBS 822 and the projection lens system 824. This results in the image light from each of the imagers 818 and 830 becoming circularly polarized. The retarder 838 may be a retarding film attached to the output surface of the combining PBS 822.

In this approach, all of the light in a color band is used for projecting the image, thus increasing the image brightness. The polarizing beamsplitters used as the prepolarizer 810 and the imaging PBS's 816 and 828 may all be formed using a compensated, multi-layer dielectric polarizer, in which case low f-number light may be used, down to f/1.5 or less. The use of compensated, multi-layer dielectric polarizers increases the amount of light passing through the projection system, since the transmission through the polarizers is high for the pass polarization state, and since low f-numbers may be used. A control unit 840 may be used to control the image imposed by the imagers 818 and 828, and to synchronize the image with the color selector 808. Where the projection system 800 comprises the projection engine for a television, for example a high definition television, the control unit 830 may also include a television tuner and other circuitry for processing and projecting a television picture image.

It will be appreciated that, although the present invention has been described with reference to displays that use reflective imagers, the present invention may also be used for pre-polarization and polarization recovery in displays that use transmissive imagers.

As noted above, the present invention is applicable to display devices, and is believed to be particularly useful in providing inexpensive, high brightness, image projection systems. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A light projection system comprising:
    an illumination light source to transmit illumination light;
    a single reflective imager unit,
    an imaging polarization beamsplitter (PBS) to reflect light received from the color selector to the single reflective imager unit, and
    a reflective pre-polarizer disposed to pre-polarize the illumination light before incidence on the imaging PBS, the reflective pre-polarizer having an extinction ratio of more than 50:1 for reflected light when illuminated over the visible spectrum with light having an f-number of no more than f/2.5.

2. A system as recited in claim 1, wherein image light reflected from the imaging core has an f-number of no more than 2.5 and a contrast ratio of at least 250:1 in each color band.

3. A system as recited in claim 1, wherein the f-number of the image light is no more than 2.

4. A system as recited in claim 1, wherein the f-number of the image light is no more than 1.5.

5. A system as recited in claim 1, wherein the contrast ratio in each color band is more than 350:1.

6. A system as recited in claim 1, wherein the reflective pre-polarizer reflects light to the imaging PBS.

7. A system as recited in claim 1, wherein the reflective pre-polarizer is a compensated, multi-layer dielectric polarizer.

8. A system as recited in claim 1, wherein the imaging PBS is a compensated, multi-layer dielectric polarizer.

9. A system as recited in claim 1, further comprising a projection lens unit disposed to project the image light, the projection lens unit having an f-number of no more than 2.5.

10. A system as recited in claim 9, wherein the projection lens unit has an f-number of no more than 2.

11. A system as recited in claim 9, wherein the projection lens unit has an f-number of no more than 1.5.

12. A system as recited in claim 1, further comprising a polarization recovery unit to convert light into a desired polarization state, the reflective pre-polarizer forming a polarization element of the polarization recovery unit.

13. A system as recited in claim 12, wherein the polarization recovery unit comprises a polarization recovery tunnel.

14. A system as recited in claim 12, wherein the polarization recovery unit is disposed between the illumination source and the reflective imager unit.

15. A system as recited in claim 12, wherein the pre-polarizer reflects light in an undesired polarization back towards the illumination source.

16. A system as recited in claim 1, the contrast ratio of more than 250:1 across all color bands is achieved using only the pre-polarizer and the imaging PBS as polarizing elements.

\* \* \* \* \*